UNITED STATES PATENT OFFICE.

WOLFF HAGELBERG, OF BERLIN, GERMANY.

METHOD OF MANUFACTURING TRANSPARENT RELIEF-PICTURES.

SPECIFICATION forming part of Letters Patent No. 428,483, dated May 20, 1890.

Application filed December 2, 1889. Serial No. 332,297. (No specimens.)

*To all whom it may concern:*

Be it known that I, WOLFF HAGELBERG, a resident of the city of Berlin, Germany, and a subject of the King of Prussia, have invented a new and useful Improvement in the Manufacture of Transparent Relief-Pictures, of which the following is a specification.

The subject of my invention is a method or process of manufacture for producing pictures by printing in colors and embossing which differ from those hitherto produced by these means, as follows: If the back of a picture produced by my method does not receive any direct light while the picture is lying or being suspended the object represented thereby is shown in relief only, no colors, shading, or delineating lines being visible, the picture having the appearance of a cameo. If, however, the back of the picture is exposed to the light, whether sunlight or from any artificial or other source—say by manipulating the picture with the hand—the picture appears in colors which are the more vivid the nearer the angle at which the rays of light fall on the back of the picture is to ninety degrees.

My method or process to produce such pictures is as follows: I use paper, celluloid, gelatine, or other material suitable for embossing and transparent when in thin layers upon which I produce the picture. The object to be shown by the picture is printed in colors on the back of the material, as the reverse or image of the picture which is to be represented to the eye. The front of the sheet is then embossed by any suitable means, care being taken that the embossed relief and the colored negative cover each other accurately. If the picture is to be surrounded by an opaque frame, it is pasted on card-board, leather, or other non-transparent material of the configuration desired for the frame; or this frame may be produced by painting or printing opaque colors on the back of the picture to correspond to the desired configuration of the frame.

Having now particularly described and ascertained the nature of my said invention and the manner in which the same is to be performed, I declare that I am aware of the existence of transparent pictures and of non-transparent relief-pictures printed in colors on the front side of the sheet; but

What I claim is—

The method of manufacturing transparent relief-pictures on paper, celluloid, gelatine, or other suitable material, consisting in printing the reverse or image of a given picture in colors on the back of the material, and subsequently embossing the picture on the front with its lines corresponding to those of the said reverse or image, whereby the picture is given the appearance of an uncolored cameo when its back is not exposed to the light, and when its back is exposed to the light the picture appears in colors, substantially as hereinbefore set forth.

In testimony whereof I have signed my name to this specification in the presence of two subscribing witnesses.

WOLFF HAGELBERG.

Witnesses:
  MAX MANEHR,
  LEOPOLD PUTZRATH.